(12) United States Patent
Asano et al.

(10) Patent No.: US 6,280,564 B1
(45) Date of Patent: Aug. 28, 2001

(54) ROBOT MOUNTER FOR MOUNTING CORE SLIDER

(75) Inventors: Yoshibumi Asano; Takayuki Onuma; Tetsuo Itakura; Tomoharu Sakuma, all of Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 09/337,099

(22) Filed: Jun. 21, 1999

Related U.S. Application Data

(62) Division of application No. 08/901,813, filed on Jul. 28, 1997, now Pat. No. 5,951,807.

(30) Foreign Application Priority Data

Jul. 31, 1996 (JP) .................................................. 8-216933

(51) Int. Cl.[7] .................................................. B32B 31/00
(52) U.S. Cl. .................................... 156/379.8; 156/379.6; 156/556; 156/566
(58) Field of Search .................................. 156/556, 566, 156/379.8, 379.6; 29/603.06

(56) References Cited

U.S. PATENT DOCUMENTS 4,866,836 * 9/1989 Von Brandt et al. ............. 29/603.06
5,499,153   3/1996 Uemura et al. .
5,612,840   3/1997 Hiraoka et al. .

FOREIGN PATENT DOCUMENTS 5-290490 * 11/1993 (JP) .

* cited by examiner

*Primary Examiner*—Jeff H. Aftergut
(74) *Attorney, Agent, or Firm*—Hogan & Hartson, LLP

(57) ABSTRACT

A method of mounting a core slider onto a suspension and a robot mounter for mounting a core slider onto a suspension are disclosed. A work having at least one or more location onto which the core slider is to be bonded is affixed on a jig board. Adhesive is applied by a dispenser at predetermined location of the suspension to be bonded. A selected core slider is picked up from a supply of core sliders by a transfer assembly, and the selected core slider is transferred with the transfer assembly to a position adjusting unit, and the position of the core slider is adjusted with the position adjusting unit. The core slider is transferred with the transfer assembly from the position adjusting unit to the predetermined location of the suspension which has adhesive thereon. The core slider retained by the transfer assembly is contacted with the adhesive disposed on the suspension. The adhesive is hardened by exposing the adhesive to UV-radiation.

5 Claims, 9 Drawing Sheets

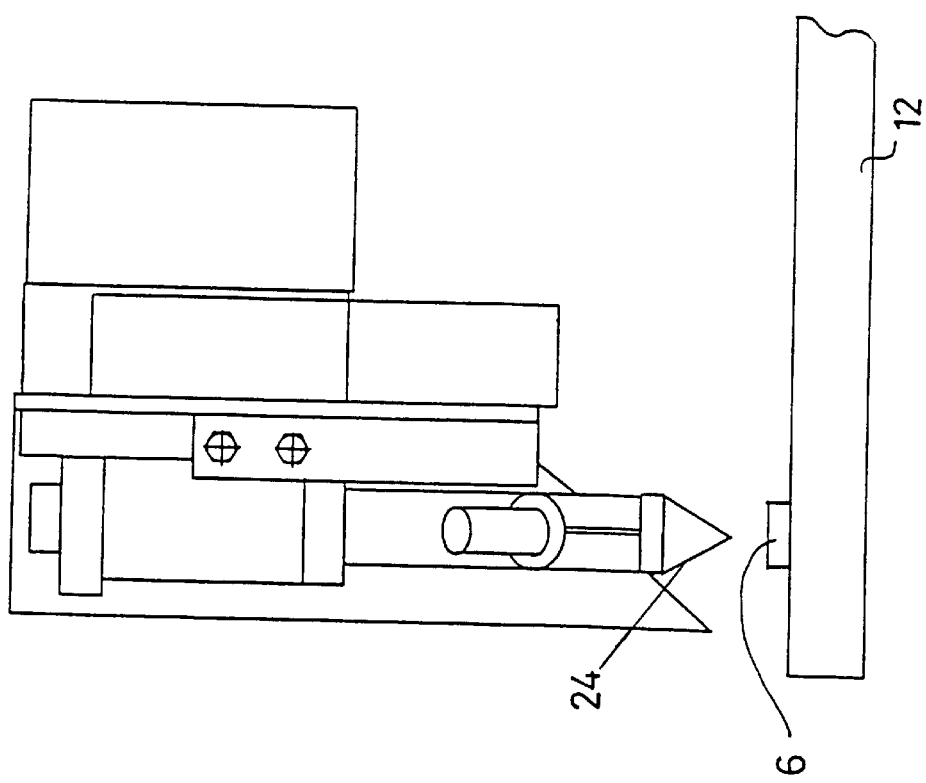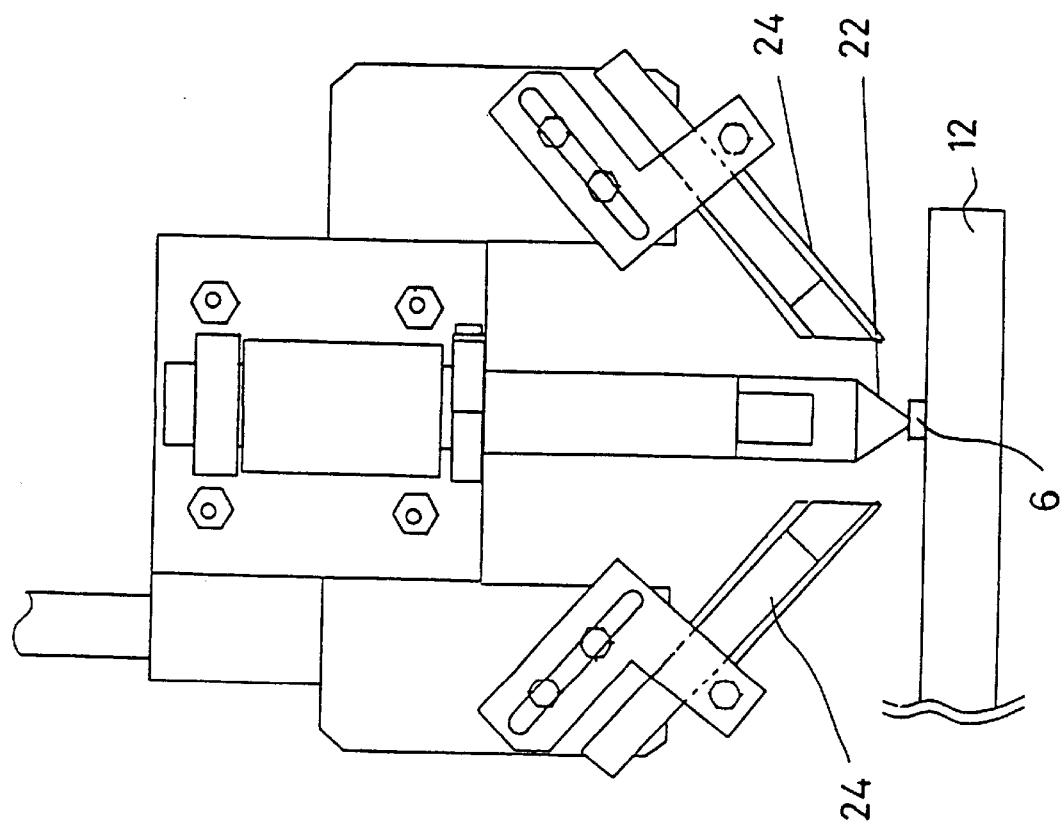

ROBOT MOUNTER FOR MOUNTING CORE SLIDER

This is a divisional of application Ser. No. 08/901,813, filed Jul. 28, 1997, and now U.S. Pat. No. 5,951,807, which application is hereby incorporated by reference in its entirety.

BACKGROUND OF THE INVENTION

This invention relates to a robot mounter and a method of mounting core sliders, especially a robot mounter which can process the steps of applying adhesive, mounting or hardening temporarily the adhesive in a short time and which is simple in construction, low-cost and small in size, and relates to a method of mounting core sliders using the robot mounter.

Although ordinary chip mounters are supplied to market by many suppliers, there is not any automatic-installing, small-size core slider for a hard-disk drive. FIG. 9 shows work 4 wherein sixteen suspensions 2 are formed continuously therein. Portion to be bonded 3 is formed in an upper portion of each suspension 2 so that core slider 6 of about 1 mm square is bonded. Although the prior automatic machine for installing core slider is required for manual working or for improvement of ordinary mounter, the machine is not yet complete as production equipment. In the automatic machine for installing core slider, know-how of temporarily hardening after applying adhesive or mounting more directly influences the quality of floating characteristics, and so on, compared with ordinary parts mounting apparatuses. It is considered that the machine does not exist even as equipment in the extended field of the prior art. In this respect, the prior art is merely a technique for mounting parts (molded package and pair chip) to board or tape (TAB) at high speed. In the automatic machine for installing a core slider, the process is divided into various steps, such as applying adhesive, mounting and temporarily hardening the adhesive. Batch processing for applying adhesive of predetermined quantity in one lot is used. However, there is not any stand-alone cell-type machine for performing the multiple steps.

Because the process is divided as described above and adhesive is applied by a dispenser in batch processing in the prior automatic machine for installing a core slider, it is possible that applying condition drifts according to the time difference between start and finish of applying the adhesive, with the result that the drift affects dispersion of applying quantity and change of viscosity. Mounting core sliders in the next process in that state causes greater deviation in mounting accuracy of core sliders. Due to the small-size core sliders, the influence becomes even greater. At this point, it is considered difficult to solve the above-described problems as far as the process is divided.

Further, a jig for manual working has a guide pin and a guide plane matching, respectively, to suspension 2 and core slider 6. Process capability is determined by jig accuracy. However, stable accuracy is not guaranteed, and maintenance is required frequently because of high-accuracy, complex-shape jigs. Mechanization of the process where the process is divided causes improved equipment efficiency but makes the machine complex, high-cost, and difficult to maintain.

The present invention solves the above-mentioned prior problems. The object of the present invention is to provide a robot mounter which can process the steps of applying adhesive, and mounting or temporarily hardening the adhesive in a short time, and which is simple in construction, low-cost, and small in size. It is also an object of the present invention to provide a method of mounting core sliders using the robot mounter.

SUMMARY OF THE INVENTION

In accordance with an embodiment of the present invention, a robot mounter comprises a jig board holding a work having at least more than one portion to be bonded, a core slider accommodating portion, accommodating at least more than one core slider, and a robot head for picking, transferring and releasing the core slider by a chuck installed at the end portion. A core slider is picked and transferred from the core slider accommodating portion to a predetermined position of portion of the work to be bonded. A dispenser is installed at the robot head for applying adhesive to a predetermined position of portion of the work to be bonded, and a positioning unit is provided for adjusting the position after the core slider is set once on the way of transfer by the robot head. The present invention provides a robot mounter for picking and transferring the core slider. Position of the core slider is adjusted by the positioning unit again using the chuck of the robot head, the core slider is mounted on a spot radiating unit for temporarily hardening the adhesive while the work having the portion to be bonded is held by the chuck. The jig board is fixed at one end of a table, and the positioning unit and the core slider accommodating portion are formed on the moving path to the jig board of the robot head. The robot head is able to move freely on position coordinates of an upper flat surface of the table or in a three dimensional space on the table.

In the present invention, the jig board is set at one end of a turn table, the turn table is turned at a predetermined angle after the work is fixed, and then the jig board is held after being released from the turn table.

In the present invention, the robot mounter is installed on a one-body frame or a table support.

The present invention comprises steps of fixing a work having at least more than one portion to be bonded on a jig board, applying adhesive at a predetermined position of portion of the work to be bonded by a dispenser, picking and transferring the predetermined core slider from a core slider accommodation portion by a chuck of a robot head, installing once the core slider on a positioning unit, adjusting the position of the core slider, picking the core slider again, transferring the core slider to portion to be bonded of the work bringing the core slider to the portion to be bonded while the core slider is being picked, and temporarily hardening the adhesive by UV-radiating a spot radiating portion.

BRIEF DESCRIPTION OF THE DRAWINGS

FIG. 4A is a plane view showing a spot radiating portion.

FIG. 4B is a side view showing the spot radiating portion of FIG. 4A.

DETAILED DESCRIPTION OF THE INVENTION

Referring to the figures, an embodiment of the present invention will be described below.

Figure 1:
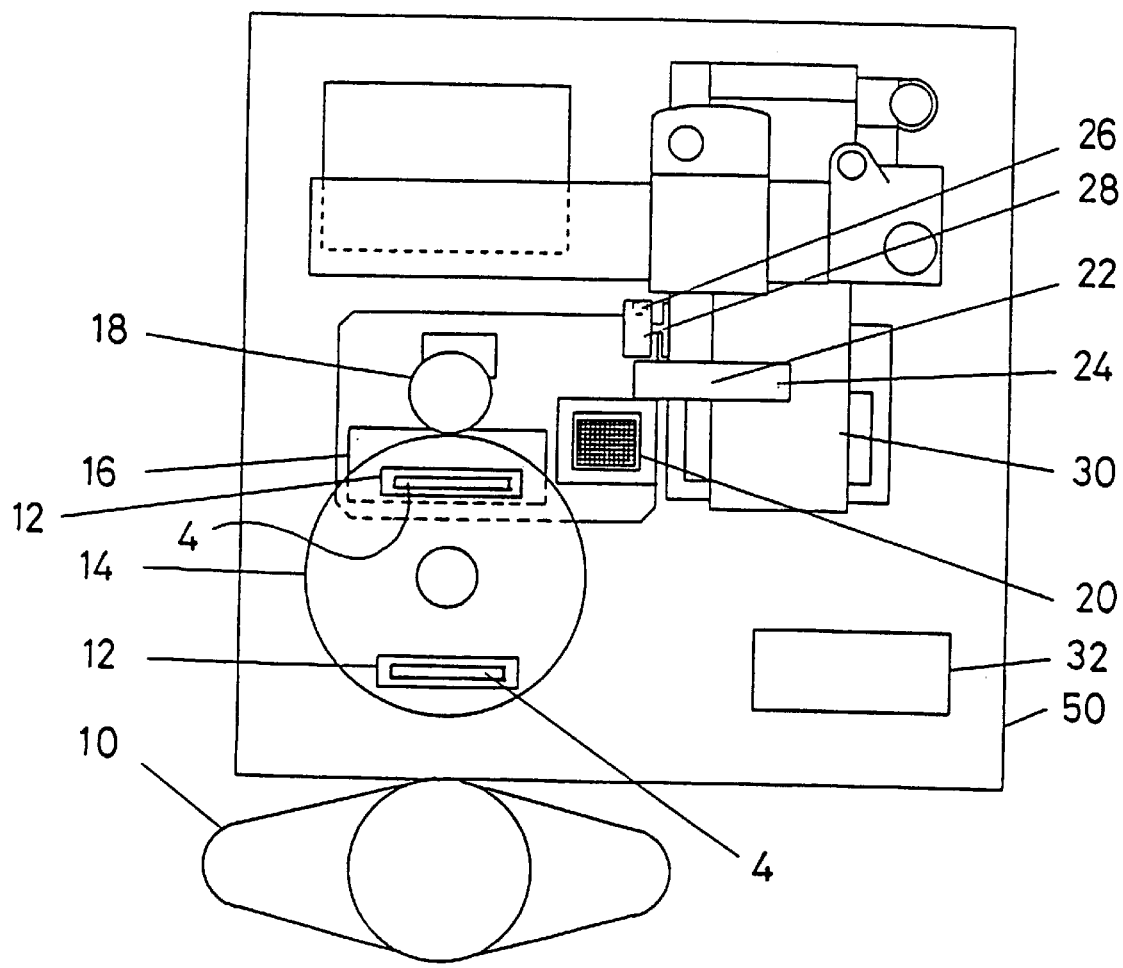
FIG. 1 is a plane view showing a robot mounter in accordance with an embodiment of the present invention.
Figure 2B:
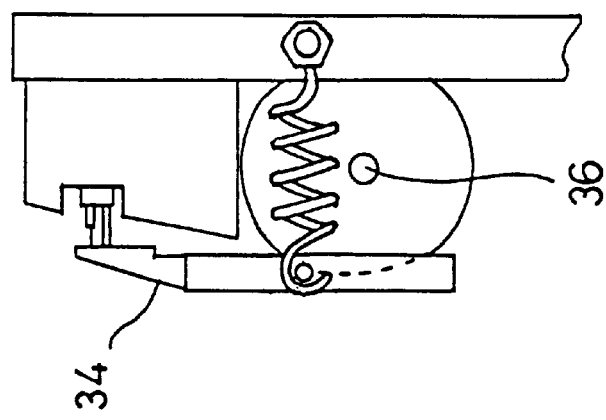
FIG. 2B is a side view showing the jig board of FIG. 2A.
Figure 2A:
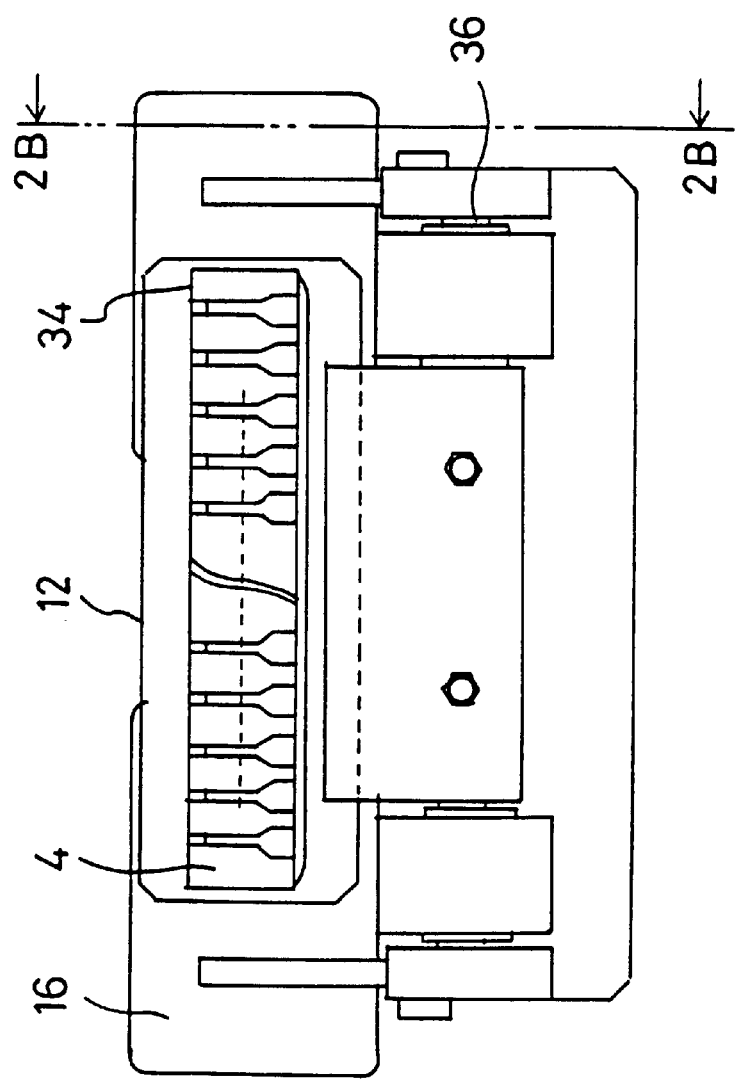
FIG. 2A is a plane view showing a jig board.
Figure 3:
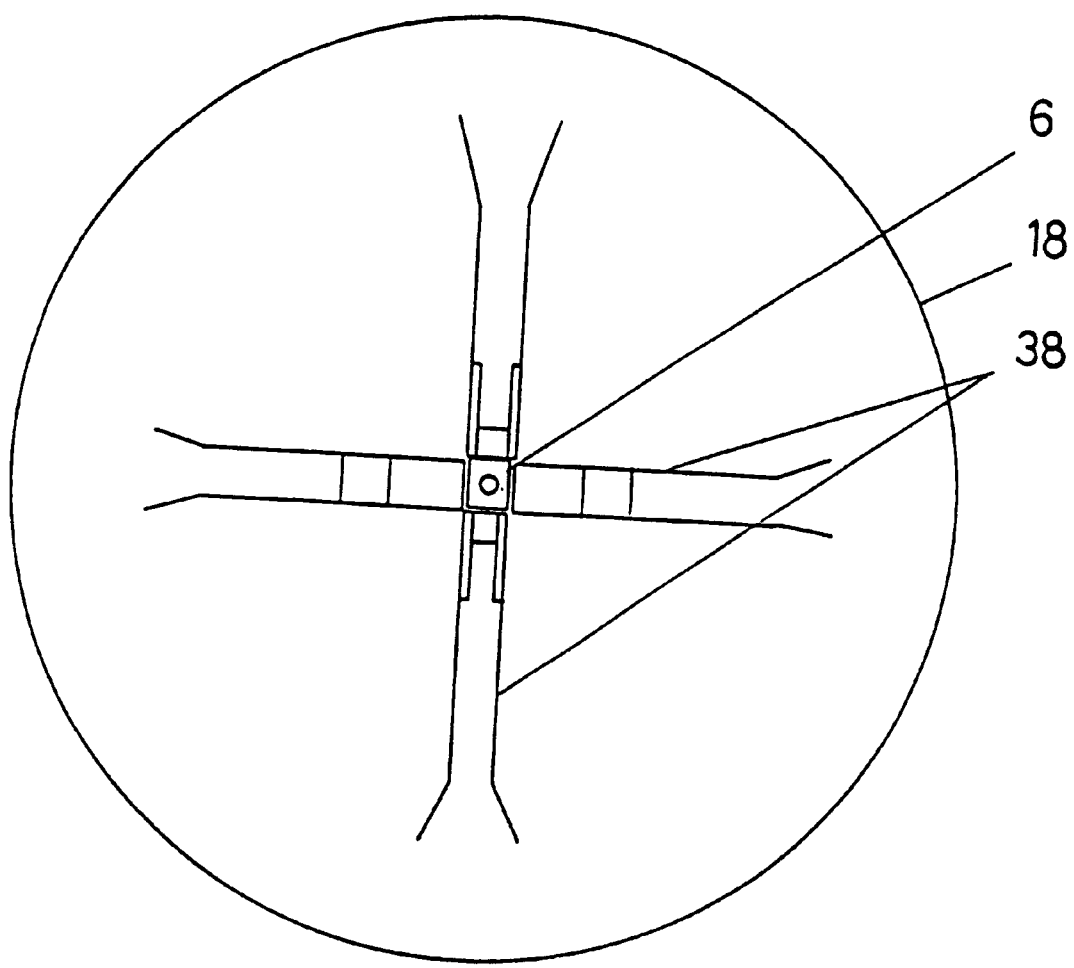
FIG. 3 is a plane view showing a positioning unit.

In FIG. 1 showing a robot mounter in accordance with an embodiment of the present invention, jig boards 12 are set on turn table 14 in front of operator 10. Two jig boards 12 are formed back and forth at 180 degrees from each other in the embodiment shown. Jig board 12 is held after turning a half revolution turn table 14 and releasing from turn table 14 by jig board rock mechanism 16. Detail of jig board 12 is shown in FIGS. 2A (plane view) and 2B (side view). In positioning unit 18, the position of core slider 6 is corrected from four directions. Detail plane view of positioning unit 18 is shown in FIG. 3. In core slider accommodating portion 20, an accommodating cell capable of expanding lengthwise and widthwise is formed, and core sliders 6 are installed therein in a state in which they are separated from one another on the flat surface. Chuck 22 picks or releases core slider 6. Spot radiating portion 24 temporarily hardens adhesive between suspension 2 and core slider 6 by UV radiation. Detail of spot radiating portion 24 is shown in FIGS. 4A (plane view) and 4B (side view). Two spot radiating portions 24 are formed at a predetermined angle from adhesive plane. Detecting sensor 26 can sense the presence or the absence of suspension 2 without touching suspension 2. Dispenser 28 applies adhesive to portion to be bonded 3 of suspension 2. Robot head 30 moves in three dimensions on operation area in each process of applying adhesive, mounting and temporarily hardening. Chuck 22, spot radiating portion 24, detecting sensor 26 and dispenser 28 are mounted on robot head 30 and move as robot head 30 moves. A central processing unit is built into robot console 32, and the operation panel controlling each part is arranged so that the operational condition is displayed at front side. Therefore, a series of operations are carried out easily. The robot console serving as a sequencer makes maintenance easy. The elements described above are gathered and arranged on one table support 50 of about 1 m square in cell type.

Figure 5:
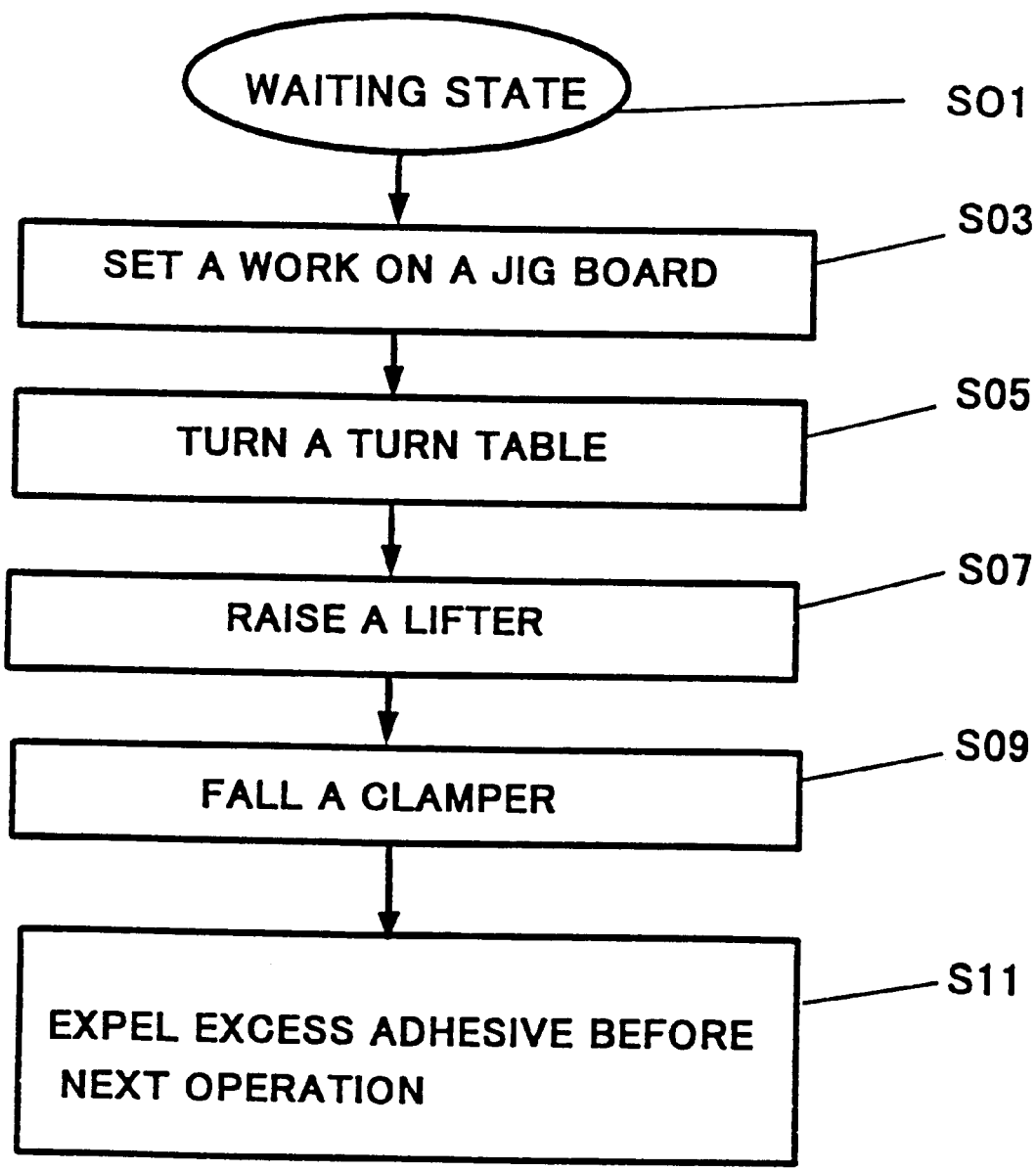
FIG. 5 is a flow chart (No. 1) of an operation performed by the robot mounter.
Figure 6:
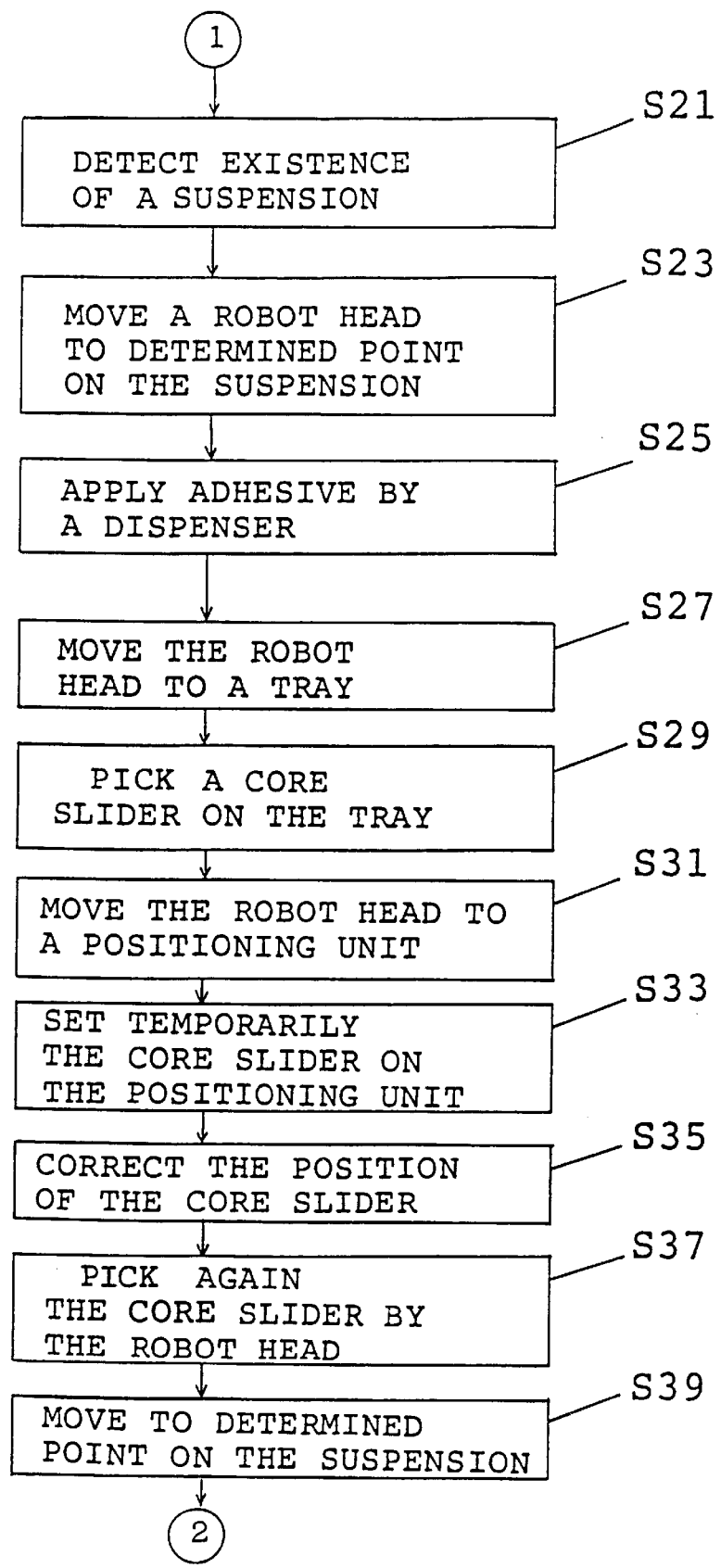
FIG. 6 is a flow chart (No. 2) of an operation performed by the robot mounter.
Figure 7:
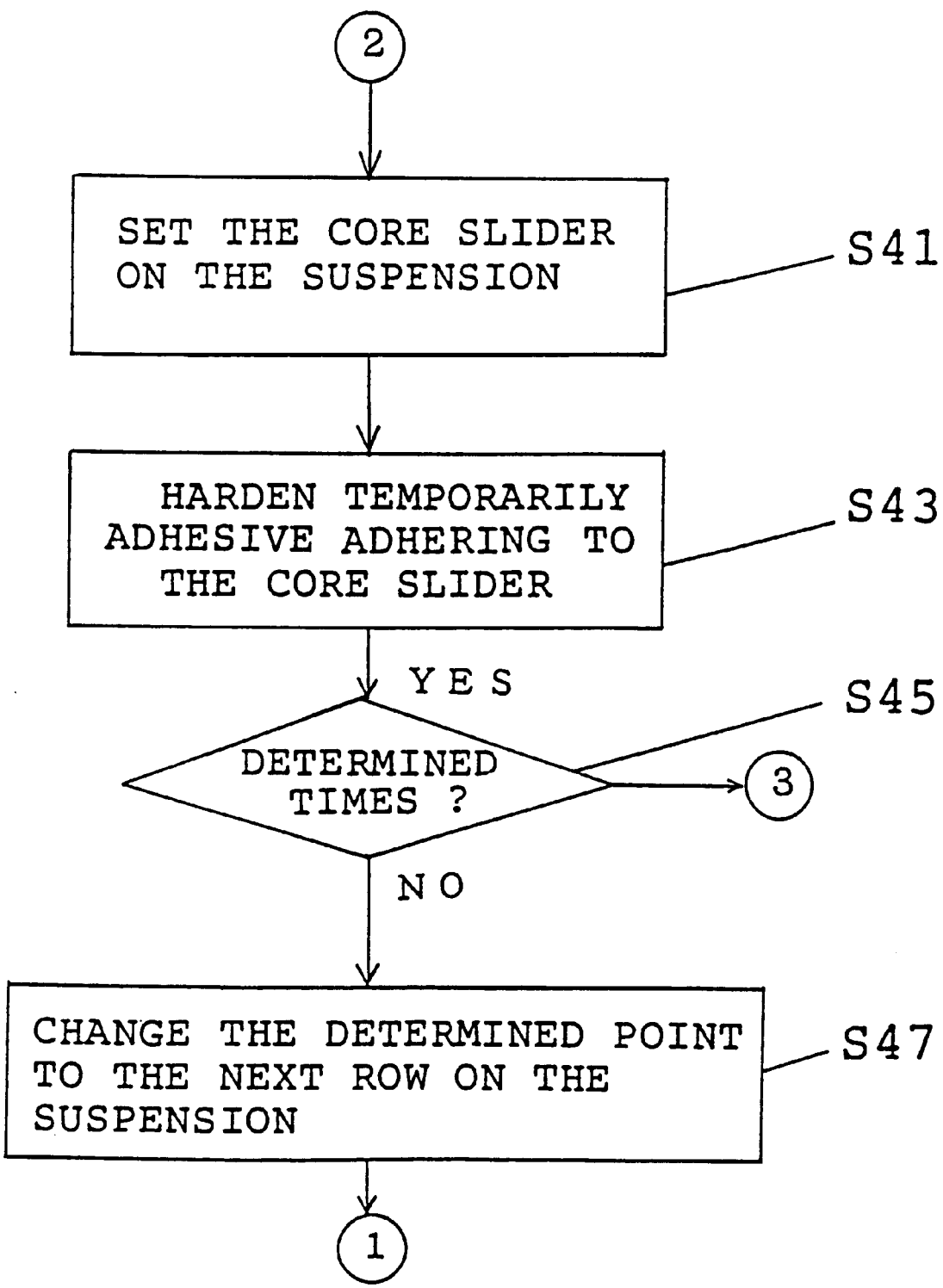
FIG. 7 is a flow chart (No. 3) of an operation performed by the robot mounter.
Figure 8:
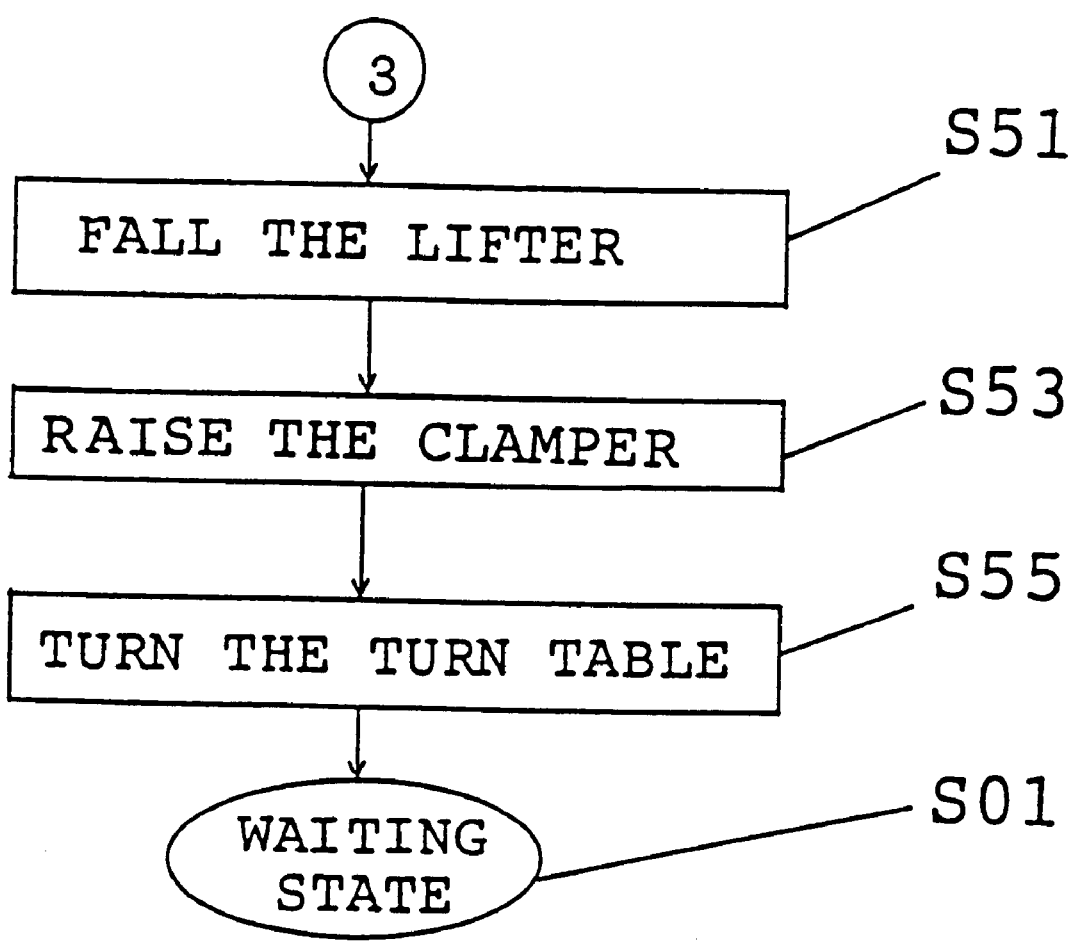
FIG. 8 is a flow chart (No. 4) of an operation performed by the robot mounter.
Figure 9:
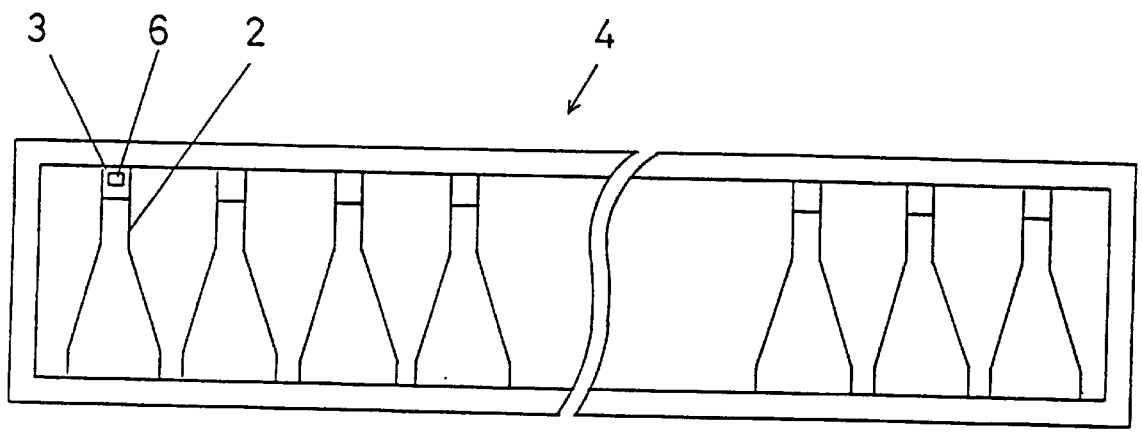
FIG. 9 is an explanatory diagram showing a work where sixteen suspensions are formed in line.

Next, the operation will be described according to flowcharts of FIGS. 5 to 8. FIGS. 5 to 8 are a series of flowcharts of operations performed by the robot mounter. In FIG. 5, step S01 shows awaiting state. Operator 10 sets work 4 on jig board 12 at step S03. FIG. 2A shows a state in which work 4 is fixed on jig board 12 therein. Closing cover 34 opens and closes about spindle 36, and work 4 can be fixed in accuracy on the order of micron. In step S05, turn table 14 turns 180 degrees with jig board 12. In step S07, jig board 12 is raised by lifter (not shown). In step S09, jig board 12 is fixed letting cramper (not shown) fall. In step S11, robot head is moved to carry out later adhesive process smoothly, and adhesive is applied previously (excess adhesive is expelled before next operation) by dispenser 28. In FIG. 6, robot head 30 moves, and detecting sensor 26 detects existence of suspension 2 in step S21. In step S23, robot head 30 moves to a predetermined point on suspension 2. Although sixteen suspensions 2 are set on work 4, these are determined one by one. In step S25, adhesive is applied by dispenser 28 to bonding portions 3 on suspensions 2. In step S27, robot head 30 moves to core slider accommodating portion 20. In step S29, core slider 6 on a tray is picked by chuck 22. In step S31, robot head 30 moves to positioning unit 18. In step S33, chuck 22 is released, and core slider 6 is set temporarily on positioning unit 18. In step S35, the position of core slider 6 is corrected by guide rod 38 operated by air pressure from four directions as shown in FIG. 3. By this, the position of core slider 6 is corrected for sixteen suspensions with the same accuracy. Although position of core slider 6 is corrected at every suspension 2 in jig for manual working, the position is corrected at only one portion of positioning unit 18. In step S37, core slider 6 is picked again by chuck 22 installed on robot head 30. In step S39, robot head 30 moves to a predetermined point on suspension 2. In FIG. 7, core slider 6 is set to bonding portion 3 of suspension 2 in step S41. In step S43, adhesive is temporarily hardened in a state in which core slider 6 is held by chuck 22. Adhesive between suspension 2 and core slider 6 is temporarily hardened by UV radiation radiated facing from two spot radiating portions 24. Radiating position and radiating angle of spot radiating portion 24 vary with shape and characteristics of core slider 6. In the embodiment, UV radiation is carried out to two points on surface of core slider 6 as shown in FIG. 4A. Although UV radiation was carried out in the past by releasing core slider 6 once from jig board or fixing thereto with manual jig, the present embodiment differs from the past in that adhesive is temporarily hardened in a state in which the core slider is held by chuck 22. Therefore, a jig for manual working is not needed. As mounting is carried out in a short time, at high accuracy and with low cost, the quality of mounting becomes stable. In step S45, a determination is made as to whether the above processes are carried out sixteen times (that is, the state in which all of the suspensions 2 are bonded therein). If the process is repeated less than sixteen times, the process goes to step S47 and the predetermined point on suspension 2 is changed to suspension 2 of the next line. After that, similar process is carried out again from step S21 of FIG. 6. On the other hand, if the process is repeated more than sixteen times, the process goes to step S51 of FIG. 6, and the lifter falls. In step S53, the cramper raises. In step S55, turn table 14 turns 180 degrees with jig board 12. Then, the process comes back to the waiting state of step S01. Further, the above-mentioned processes are repeated, changing the work 4 to others. Although core slider 6 is bonded to suspension 2 in the embodiment, other small size core sliders that are not limited to the above embodiment can similarly be bonded to another work by the present robot mounter.

As described above, the present invention comprises a robot head capable to move freely in position coordinates of three dimensional space, a jig board fixing a work under the moving path of the robot head, a core slider accommodating portion accommodating a lot of core sliders to be installed on the work, and a positioning unit for positioning accurately the position of core slider at a suitable position between the jig board and the core slider accommodating portion. These composing elements can make mounting of core sliders to work with dispersion less than 10 $\mu$m.

The robot head has a dispenser for applying adhesive and spot radiating portion for hardening temporarily the adhesive. As the robot head can carry out a series of processes from picking, transferring and releasing work applying adhesive, and hardening temporarily the adhesive in a series—variable workings are carried out in a short time with simple construction. The compact construction of equipment maintains cleanliness and improves mounting quality.

As the processing of the present embodiment does not use the conventional batch processing, the parameter of applying quantity of adhesive and bonding position can be changed easily. Accordingly, not only is the safety of the operator kept, but also applying accuracy is improved.

What is claimed is:

1. A robot mounter for mounting a core slider onto a suspension, the robot mounter comprising;

a jig board that holds a suspension, the suspension having at least one bonding portion onto which the core slider is to be bonded;

a core slider accommodating portion that accommodates at lest one core slider to be bonded to said at least one bonding portion;

a robot head moveable in predetermined position coordinates of three dimensional space and having a dispenser for applying adhesive to predetermined locations of the suspension to be bonded, a spot radiating unit for hardening the adhesive between the suspension and the core slider, and transfer means for transferring a selected core slider from the core slider accommodating portion to said at least one bonding portion;

a positioning unit that adjusts a position of the core slider after said core slider is set once more under a predetermined transfer path between a predetermined waiting position of said robot head and said jig board.

2. A robot mounter according to claim 1, wherein said robot mounter is installed on a table support.

3. A robot mounter according to claim 1, wherein said transfer means comprises a chuck for picking, transferring, and releasing the core slider.

4. A robot mounter according to claim 1, wherein said robot head comprises detecting means for detecting presence of the suspension and the core slider.

5. A robot mounter according to claim 2, further comprising a turn table rotatably mounted on the table support, and a jig board rock mechanism provided on the table support, wherein said jig board is set at one end of the turn table, so that said turn table is turned by a predetermined angle after said work is fixed to said jig board, and after said jig board is positioned by a jig board rock mechanism and released from said turn table.

* * * * *